United States Patent [19]

Tank

[11] Patent Number: 5,484,096
[45] Date of Patent: Jan. 16, 1996

[54] METHOD OF BONDING TWO BODIES TOGETHER BY BRAZING

[76] Inventor: Klaus Tank, 9 Warbleton Avenue, Essexwold, Johannesburg, South Africa

[21] Appl. No.: 265,203

[22] Filed: Jun. 24, 1994

[30] Foreign Application Priority Data

Jul. 7, 1993 [ZA] South Africa ............................ 93/4877

[51] Int. Cl.⁶ ............................ B23K 31/00; B23K 13/01
[52] U.S. Cl. ................................. 228/121; 228/122.1
[58] Field of Search .................................. 228/122.1, 250, 228/226, 225, 246, 121, 56.3; 451/DIG. 911; 76/DIG. 11, DIG. 12

[56] References Cited

U.S. PATENT DOCUMENTS

| | | | |
|---|---|---|---|
| 3,743,489 | 7/1973 | Wentorf, Jr. et al. | 51/307 |
| 3,745,623 | 7/1973 | Wentorf, Jr. et al. | 407/119 |
| 3,767,371 | 10/1973 | Wentorf, Jr. et al. | 51/307 |
| 4,063,909 | 12/1977 | Mitchell | 51/309 |
| 4,151,686 | 5/1979 | Lee et al. | 51/307 |
| 4,348,131 | 9/1982 | Shimanuki et al. | 228/226 X |
| 4,793,828 | 12/1988 | Burnand | 51/293 |
| 4,890,783 | 1/1990 | Li | 228/122.1 |
| 5,028,177 | 7/1991 | Meskin et al. | 76/DIG. 12 |

FOREIGN PATENT DOCUMENTS

| | | |
|---|---|---|
| 0003116 | 8/1979 | European Pat. Off. . |
| 846808 | 7/1958 | United Kingdom . |
| 2008001 | 11/1978 | United Kingdom . |

*Primary Examiner*—P. Austin Bradley
*Assistant Examiner*—Jeanne M. Elpel
*Attorney, Agent, or Firm*—Scully, Scott, Murphy & Presser

[57] ABSTRACT

A method of brazing a first body to a second body having particular application to the bonding of a composite abrasive compact to a substrate. The method involves the steps of providing a brazing shim comprising at least two zones having differing melting temperatures, placing the shim on a surface of the first body, placing a surface of the second body on the shim to form an unbonded assembly, applying heat to the assembly to cause the shim to melt and allowing the assembly to cool to a temperature at which all the zones of the shim become solid.

14 Claims, 1 Drawing Sheet

METHOD OF BONDING TWO BODIES TOGETHER BY BRAZING

BACKGROUND OF THE INVENTION

This invention relates to the bonding of bodies together by brazing.

When bodies are bonded together by means of induction brazing, it is found that a temperature gradient is set up in the bonding interface. A greater degree of heating takes place at the periphery of the interface than at the centre, so that when a brazing shim is used, the outer or peripheral portion of the shim melts before the inner or central portion. This leads to eventual uneven distribution of the shim material because, on melting, the braze material has a tendency to flow away from the central portion of the shim, often forming a fillet at the edge of the interface. While the fillet may improve bond strength locally, the resultant uneven distribution of braze material overall leads to poor bonding and creates a weak point in the bonded assembly.

SUMMARY OF THE INVENTION

According to a first aspect of the invention, a method of bonding a first body to a second body comprises the steps of:

(i) providing a brazing shim comprising at least two zones having differing melting temperatures;

(ii) placing the shim on a surface of the first body;

(iii) placing a surface of the second body on the shim to form an unbonded assembly;

(iv) applying heat to the assembly to cause the shim to melt; and (v) allowing the assembly to cool to a temperature at which all the zones of the shim become solid.

Metals and alloys have a solidus temperature at which the metal or alloy begins to melt and a liquidus temperature at which the metal or alloy is completely molten. In this specification "melting temperature" or "melting point" is used in the same sense as the liquidus temperature of a metal or alloy. In brazing, a metal or alloy is generally heated to a temperature at or above its liquidus temperature and this temperature is known as the working temperature.

According to a second aspect of the invention, a brazing shim for use in the above method includes at least two zones having differing melting temperatures.

In one preferred fore of the invention, the brazing shim has a central zone having the lower of the melting temperatures and an outer zone, surrounding the central zone, having the higher of the melting temperatures.

In another preferred form of the invention, the brazing shim has a central zone, an intermediate zone surrounding the central zone and an outer zone surrounding the intermediate zone, the melting temperature of the intermediate zone being higher than that of the central zone, and lower than that of the outer zone.

DESCRIPTION OF EMBODIMENT OF THE INVENTION

Figure 1:
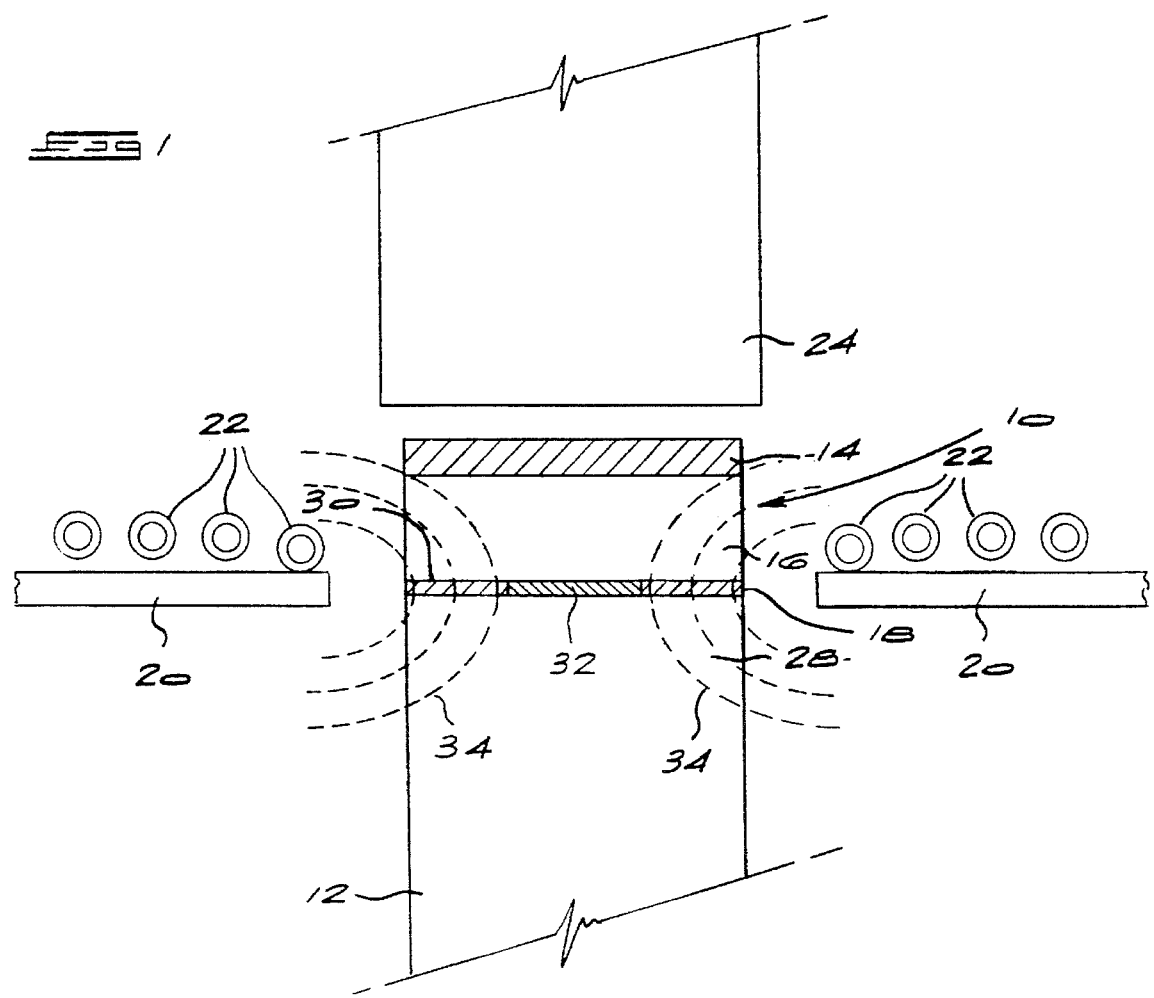
FIG. 1 shows a sectional side view of an induction brazing apparatus which can be used in the brazing method of the invention.

The brazing shim of the invention provides a bonding medium for the bonding together of two bodies. The bodies may be of the same or of different material. In the latter case, the bodies will generally possess different thermal properties.

The method of the invention is particularly suited to the bonding of a composite abrasive compact to a substrate. Composite abrasive compacts consist of an abrasive compact layer bonded to a cemented carbide support. The abrasive compact layer may be a diamond compact layer, also referred to as PCD, or a cubic boron nitride layer, also referred to as PCBN. Examples of such composite abrasive compacts are described in U.S. Pat. Nos. 3,745,623, 3,767,371, 3,743,489, 4,151,686, 4,063,909 and 4,793,828. These United States patents describe composite abrasive compacts in which the abrasive compact layers all contain a second phase which may be metallic or ceramic in nature. Such second phases may be leached away leaving a network of empty pores between adjacent abrasive particles.

In bonding such composite abrasive compacts to a substrate, bonding will take place through the carbide support. The substrate will typically also be made of cemented carbide. The cemented carbide for the support and substrate may be any known in the art such as cemented tungsten carbide, cemented tantalum carbide, cemented titanium carbide, cemented molybdenum carbide or mixtures thereof. Bonding takes place between carbide surfaces.

The invention may be utilized in bonding a diamond body such as that formed by chemical vapor deposition to a substrate. The substrate may also be a cemented carbide substrate.

The shim will be metallic, and will be made of two or more metals or alloys (including active brazing alloys), differing in melting temperatures and each defining a particular zone or area of the shim. There may be a sharp transition between the zones and thus a sharp transition in melting temperature at the boundary between adjacent zones. Alternatively, the transition may be gradual with the alloys of such adjacent zones blending together at the boundary so that the change in melting temperature from one zone to its neighbor is gradual. Where it is desired that the entire shim should melt more or less simultaneously across an interface between two bodies being bonded the zone of the higher melting temperature should be located in a region which will heat up quicker than other regions. The component alloys or metals of the shim may thus be chosen to suit the heat flux profile for the particular bodies being bonded. The metals or alloys can be chosen to melt in any desired sequence.

The brazing shim will generally be produced in sheet form and may be shaped to follow the contour of the bonding interface between the two bodies being bonded. The brazing shim may have a size and shape matching that of the bonding interface. Examples of typical shapes, in plan, are disc, rectangular, triangular and irregular. When it melts, the shim forms an interfacial molten layer and, on cooling and solidification, provides a strong bond securing the bodies together.

In the case where the shim is in the form of a flat disc, the zones of differing temperature may be concentrically arranged about a central axis. The outermost or peripheral zone will have the highest melting temperature. The zone adjacent to it will have a lower melting temperature. Progressing toward the centre, each successive zone will have a lower melting temperature.

An embodiment of the invention will now be described with reference to the accompanying drawings.

Referring to FIG. 1, a composite abrasive compact 10 is shown being bonded to a right-circular cylindrical support pin 12 using a brazing shim 18 and in an induction brazing process. The support pin 12 is typically made of cemented carbide. The compact 10 is right-circular cylindrical in shape and has a polycrystalline diamond (PCD) abrasive compact layer 14 bonded to a cemented carbide support 16. The brazing apparatus includes a concentrator plate 20 (usually made of copper), above which are located the rings 22 of an induction heating coil. The innermost ring is in electrical contact with the concentrator plate. A plunger 24 exerts downward force on the composite compact 10 during the brazing cycle.

In the brazing process, the shim 18 is placed on the top surface of pin 12 and the lower surface of support 16 brought into contact with the shim 18, as shown in FIG. 1. The plunger is lowered into contact with the diamond compact layer 14 and the induction coil is energised. The electrical current flowing through the rings 22 sets up a magnetic field which passes through the workpiece components—the compact 10, shim 18 and support pin 12. Inductive heating takes place first in the peripheral region 28 of the workpiece components within the dotted lines 34 which indicate generally the magnetic field lines.

Thus, the shim 18 heats up faster in its peripheral zone 30, while the central zone 32 heats up more slowly. By making the peripheral zone 30 of a higher melting temperature material, melting thereof can be delayed until the central zone 32 has reached its melting temperature or even a higher temperature.

When the shim has melted sufficiently with the metals or alloys of the respective zone having reached their working temperatures, heating is stopped. Cooling follows and this allows the metals or alloys of the shim to solidify and form a strong bond between the support pin 12 and the carbide support 16 of composite compact 10, thereby producing a tool insert which may be secured to a tool, such as a drill bit.

Figure 2:
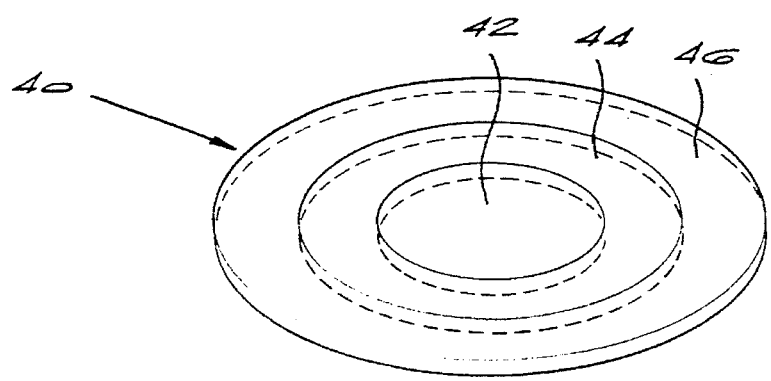
FIG. 2 shows a perspective view of an example of a brazing shim according to the invention.

FIG. 2 shows a three component shim 40 in circular disc form. The central zone 42 is made of an alloy or metal with a relatively low melting point. Adjacent to it and surrounding it is an intermediate zone 44 of an alloy or metal of higher melting point. Surrounding this zone 44 is an outer zone 46 of a metal or alloy having the highest melting point of the three components. Depending on the brazing requirements for a particular assembly of unbonded components, the braze shim can include irregularly shaped regions of different melting temperatures.

The following examples illustrate the invention:

EXAMPLE 1

A 20 mm diameter metallic shim was prepared from two alloys. An inner 10 mm diameter centre was made of DBF1, a braze alloy having a liquidus temperature of about 915° C. and consisting of the following composition by mass:

Cu 53%; Au 14.5%; Ni 3.5% and Mn 29%.

Surrounding the central alloy and in contact with it, was a ring of Palnicurom 10 (Palnicurom is a trade mark of Wesgo/GTE of Belmont, Calif.) having a liquidus temperature of about 1013° C. and the following composition by mass:

Au 25%; Ni 10%; Pd 15%; Mn 13% and Cu 37%.

The shim was used to bond the carbide support of a composite diamond abrasive compact sold under the trade name Syndrill to a cemented tungsten carbide substrate containing 13% by mass of cobalt. Both compact and substrate were of right-circular cylindrical shape with outer diameter of 20 mm. The compact was placed in the holder in a conventional induction brazing apparatus as shown in FIG. 1. Heat was applied in a reducing atmosphere until the outer region of the shim was seen to melt, after which, the assembly was allowed to cool and the shim solidify. The brazing cycle time was 30 seconds.

A strong bond was obtained between the carbide support of the Syndrill and the carbide substrate. The bonded assembly was subjected to ultrasonic scanning. The image produced showed no discontinuities across the interface. The assembly was thereafter sectioned diagonally and the interfacial region examined. It was noticed that the entire shim had melted and resolidifed to form a continuous bond across the interface.

EXAMPLE 2

A three alloy component shim as illustrated by FIG. 2 was prepared by pressing together a central disc and two outer concentric rings. Their characteristics were as follows:

|  | Alloy | Liquidus T, °C. | Composition, Mass % |
|---|---|---|---|
| Central disc | Degussa 6488 | 770 | 64 Ag 26 Cu 6 In 2 Ni 2 Mn |
| Inner ring | Degussa 21/80 | 990 | 86 Cu 2 Ni 12 Mn |
| Outer ring | Copper only | 1100 | 100 Cu |

Using the above shim, a 65 mm diameter tungsten carbide disc was bonded to a 65 mm diameter tungsten carbide disc by means of high frequency induction brazing. Again, ultrasonic scanning and visual inspection showed a continuous bond across the interface.

EXAMPLE 3

A further three component braze shim was prepared with a diameter of 38 mm and was made up as follows:

|  | Alloy | Liquidus T, °C. | Composition, Mass % |
|---|---|---|---|
| Central disc | DBF1 | 915 | 53 Cu 14.5 Au 3.5 Ni 29 Mn |
| Inner ring | Degussa 21/80 | 990 | 86 Cu 2 Ni 12 Mn |
| Outer ring | Degussa 97/3 | 1100 | 97 Cu 0.6 Si 2.4 Ni |

The shim was used to bond together by high frequency induction brazing a round Syndrill blank 38 mm in diameter to a tungsten carbide post. Ultrasonic imaging and visual inspection of the sectioned interface showed no evidence of discontinuous bonding.

EXAMPLE 4

A 10 mm square piece of a PCBN composite sold under the trade name DBC50 was brazed to a tungsten carbide substrate using high frequency induction brazing in an argon atmosphere and the following two component shim 10 mm square:

|  | Alloy | Liquidus T, °C. | Composition Mass % |
| --- | --- | --- | --- |
| Central square | Nicuman* 37 | 925 | 52.5 Cu 9.5 Ni 38 Mn |
| Outer square | Cocuman* | 999 | 58.5 Cu 10 Co 31.5 Mn |

*Trade mark of Wesgo/GTE

Ultrasonic imaging and visual inspection of the sectioned interface showed no evidence of discontinuous bonding.

EXAMPLE 5

A 25 mm equilateral triangle of silicon nitride was brazed to a stainless steel support under vacuum in a high frequency induction furnace having an external induction coil using the following two component shim:

|  | Alloy | Liquidus T, °C. | Composition Mass % |
| --- | --- | --- | --- |
| Central triangle | Cusil-ABA* | 815 | 32.75 Cu 63 Ag 1.75 Ti |
| Outer triangle | Copper-ABA* | 1024 | 92.75 Cu 2 Al 3 Si 2.25 Ti |

*Trade mark of Wesgo/GTE

Ultrasonic imaging and visual inspection of the sectioned interface showed no evidence of discontinuous bonding.

I claim:

1. A method of bonding a first body to a second body comprising the steps of:
   (i) providing a brazing shim comprising at least two zones having differing melting temperatures;
   (ii) placing the shim on a surface of a first body made of cemented carbide;
   (iii) placing a surface of a second body made of cemented carbide on the shim to form an unbonded assembly, wherein both said first and said second bodies are in direct contact with each to the at least two zones;
   (iv) applying heat to the assembly to cause the shim to melt thereby bonding the assembly; and
   (v) allowing the assembly to cool to a temperature at which all the zones of the shim become solid.

2. A method according to claim 1 where at least one of said first and said second bodies has an abrasive compact layer bonded to it.

3. A method according to claim 1 wherein the brazing shim of step (i) has a central zone having the lower of the melting temperatures and an outer zone, surrounding the central zone, having the higher of the melting temperatures.

4. A method according to claim 1 wherein the brazing shim of step (i) comprises a central zone, an intermediate zone surrounding the central zone and an outer zone surrounding the intermediate zone, the melting temperature of the intermediate zone being higher than that of the central zone, and lower than that of the outer zone.

5. A method according to claim 1 wherein the brazing shim of step (i) has a size and shape matching the interface between the two surfaces being bonded.

6. A method according to claim 1 wherein said brazing shim of step (i) is characterized by a sharp transition in melting temperature at the boundary between adjacent zones.

7. A method according to claim 1 wherein said brazing shim of step (i) is characterized by a gradual transition in melting temperature at the boundary between adjacent zones.

8. A method of bonding a first body to a second body comprising the steps of:
   (i) providing a brazing shim comprising at least two zones having differing melting temperatures;
   (ii) placing the shim on a surface of a first body;
   (iii) placing a surface of a second body, said second body made of different material than said first body, with the proviso that one of said first and said second bodies is made of cemented carbide, on the shim to form an unbonded assembly, wherein both said first and said second bodies are in direct contact with each of the at least two zones;
   (iv) applying heat to the assembly to cause the shim to melt thereby bonding the assembly; and
   (v) allowing the assembly to cool to a temperature at which all the zones of the shim become solid.

9. A method according to claim 8 wherein whichever of said first body and said second body is made of cemented carbide has an abrasive compact layer bonded to it.

10. A method according to claim 8 wherein the brazing shim of step (i) has a central zone having the lower of the melting temperatures and an outer zone, surrounding the central zone, having the higher of said melting temperatures.

11. A method according to claim 8 wherein the brazing shim of step (i) comprises a central zone, an intermediate zone surrounding the central zone and an outer zone surrounding the intermediate zone, the melting temperature of the intermediate zone being higher than that of the central zone and lower than that of the outer zone.

12. A method according to claim 8 wherein the brazing shim of step (i) has a size and a shape matching the interface between the two surfaces being bonded.

13. A method according to claim 8 wherein the brazing shim of step (i) has a sharp transition in melting temperature at the boundary between adjacent zones.

14. A method according to claim 8 wherein the brazing shim of step (i) has a gradual transition in melting temperature at the boundary between adjacent zones.

* * * * *

UNITED STATES PATENT AND TRADEMARK OFFICE
CERTIFICATE OF CORRECTION

PATENT NO. : 5,484,096
DATED : January 16, 1996
INVENTOR(S) : Klaus Tank

It is certified that error appears in the above-indentified patent and that said Letters Patent is hereby corrected as shown below:

Column 1, line 49: "fore" should read --form--

Column 5, line 45, Claim 1: "to" should read --of--

Signed and Sealed this

Fifth Day of November, 1996

Attest:

BRUCE LEHMAN

*Attesting Officer*     *Commissioner of Patents and Trademarks*